Patented July 4, 1933

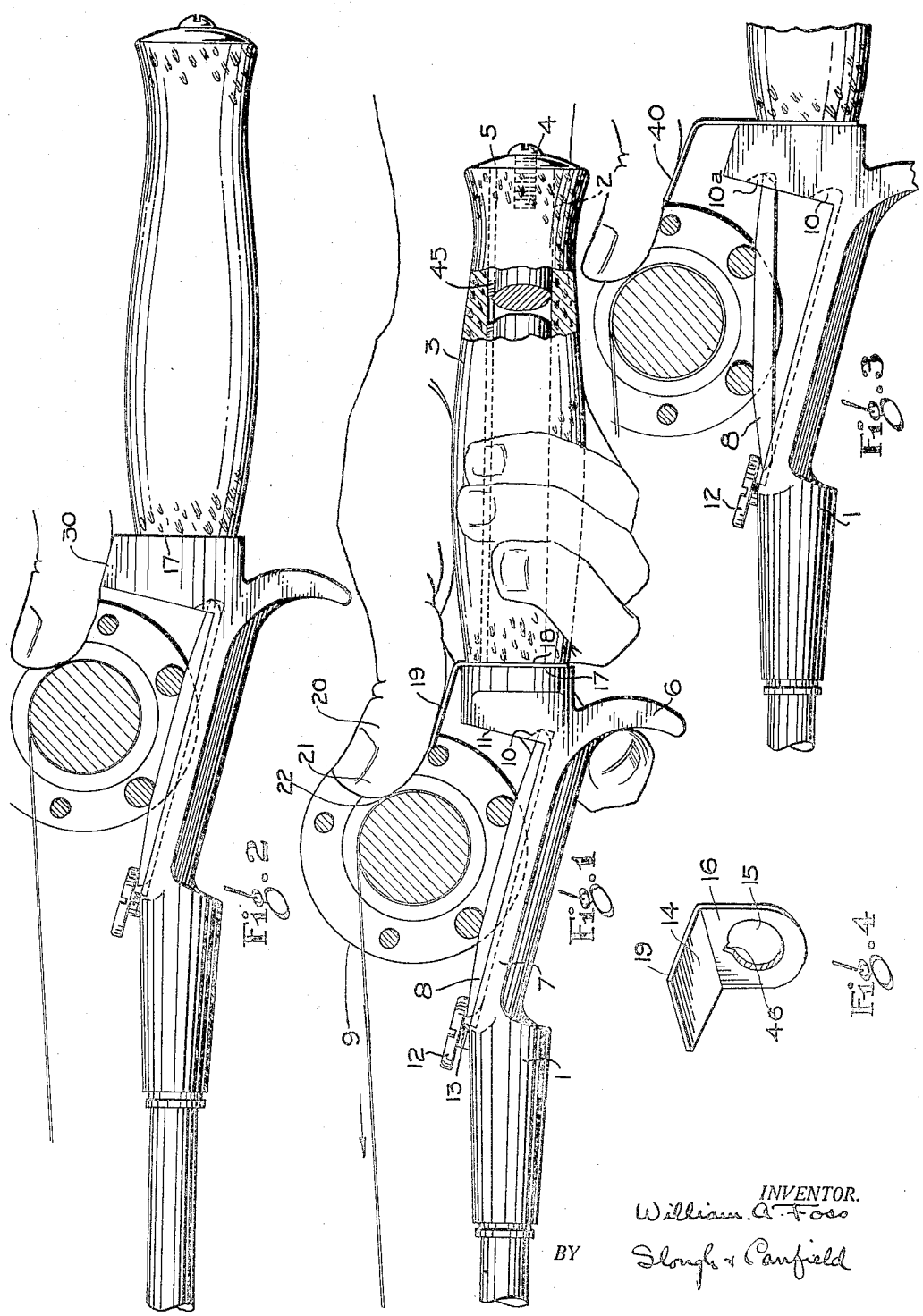

1,916,924

UNITED STATES PATENT OFFICE

WILLIAM A. FOSS, OF CLEVELAND, OHIO, ASSIGNOR TO THE AMERICAN FORK & HOE COMPANY, OF CLEVELAND, OHIO, A CORPORATION OF OHIO

FISHING ROD HANDLE

Application filed November 7, 1929. Serial No. 405,329.

This invention relates to fishing rods of the bait casting type and more particularly to the handle construction thereof.

In the skilled use of a casting rod whether in casting with artificial bait as in fishing or with a slug as in sporting events, the reel from which the line runs is controlled in its rotation by the thumb of the caster. The end of the thumb of the hand holding the rod is pressed upon a portion of the drum or upon the line wound thereon to exert a braking action thereon. Thus, the reel is prevented from overhauling the line and tangling the same, and also the distance of the throw may similarly in part be controlled.

However, in rods and rod handles as heretofore constructed, the entire thumb outwardly from the knuckle joint must be moved and it is difficult to control to the required sensitive degree the braking pressure exerted by the extreme end of the thumb. Furthermore, the thumb is rendered substantially useless to assist in gripping the rod handle because of the necessity of holding it in position to exert the sensitive braking action, and as a consequence the handle must be gripped almost entirely between the fingers and the palm. Inasmuch as the thumb is the primary gripping element of the hand, to thus delegate it to the braking function renders undesirably difficult the gripping of the handle.

It is, therefore, one of the objects of this invention to provide in the handle construction of a casting rod a base, fulcrum or pivot upon which the thumb may be rested in order that the braking action may be rendered more sensitive and more easily controlled.

Another object is to provide in a handle construction of the class described, a thumb rest which may not only serve as a fulcrum for the thumb in braking the reel, but also as a part of the grip portion of the handle engageable by the thumb in the act of gripping the handle.

Another object is to provide an improved handle construction for casting rods provided with portions engageable by the thumb of the caster to both assist in the gripping action and serve as a fulcrum for the thumb to sensitively regulate and control the braking action on the reel.

Another object is to provide a handle construction of the class described adaptable to reels which are mounted adjacent to or at a distance from the axis of the handle.

Another object is to provide a handle for casting rods with means for securing a reel thereon with the rotational axis of the reel at different selected lateral distances from the rod axis and provided with a thumb rest of the character described, so disposed that the caster's thumb may be rocked thereon to effect a braking action on the reel in any of its said selected positions.

Other objects will be apparent to those skilled in the art to which this invention pertains.

My invention is fully disclosed in the following description taken in connection with the accompanying drawing, in which:—

Fig. 1 is a side elevational view substantially full size of a casting rod handle embodying my invention and showing the manner of its use;

Fig. 2 is a view similar to Fig. 1 with parts thereof omitted showing a modification of my invention;

Fig. 3 is a view showing another modification of my invention;

Fig. 4 is a view of a thumb rest in one of the modifications thereof which I may employ, shown separately.

Referring to the drawing, I have shown at 1 generally the main body portion of the casting rod handle formed preferably from light metal, such as aluminum. The body comprises a rearwardly extending shank 2, joining the body portion proper at a transverse shoulder 17, upon which is mounted a grip preferably of cork, the grip being telescoped over the shank 2 and normally abutting inwardly against the shoulder 17 and retained thereon by a screw 4 threaded into the shank 2 and a clamping and finishing washer 5.

On the lower side of the handle body is a finger grip 6. On the upper side of the body is a downwardly rearwardly sloping support 7 upon which may be rested the supporting base 8 of a reel 9. The rear portion of the base 8 is lodged in a shallow pocket 10 at the base of a forwardly facing shoulder 11 of the handle body and the base 8 of the reel may be clamped on the support 7 and in the pocket 10 by a suitable clamping device such as the thumb screw 12, the head of which overlaps the reel base 8 and the threaded body 13 of which is screw threaded into the handle body 1. The parts thus far described constitute no essential part of my invention and are well known in the art and may be constructed as shown in detail in Fig. 1 or variously modified.

The thumb rest, which constitutes an essential part of my invention, will now be described, referring particularly to Figs. 1 and 4. The thumb rest is shown generally at 14. It comprises generally a body portion or piece of sheet metal 16 perforated as at 15 to be telescoped over the shank 2 of the handle and adapted to be clamped between the shoulder 17 and the end 18 of the grip 3. Above the body portion 16, a fulcrum portion 19 is bent forwardly at an obtuse diedral angle with the body portion 16, thus providing a rearwardly downwardly sloping planular perch, base or fulcrum.

When the hand of the caster grips the handle as a whole, as with his right hand, his first finger embraces the finger grip 6, his other fingers close around the grip 3 and his thumb rests upon the perch or fulcrum 19. Thus, in gripping the handle, the perch 19 forms a part of the gripping portions and the handle may thus be securely gripped with a small effort, because the gripping function of the thumb may be fully utilized. At the same time, the first joint 20 of the thumb is free to be rocked on the perch 19 as a fulcrum to bring the ball of the thumb 21 into frictional engagement with the reel or the line thereon as at 22 to exert the hereinbefore described braking action thereon.

As will be apparent, the thumb being supported so short a distance from the braking point 21 thereon, the braking action may be very sensitively regulated and controlled and at the same time the exercise thereof does not interfere with the gripping action of the thumb. Thus, both the gripping and braking functions are improved.

In the preferred form of construction of the handle grip 3 and shank 2, the shank is of circular cross-section with a tongue 45 extending longitudinally along one side thereof. The purpose of the tongue 45 is to prevent rotation of the cork grip 3 on the shank 2. When my invention is applied to a grip of this construction, I provide a notch 46 in the periphery of the perforation 15, as shown in Fig. 4. The notch 46 will engage the tongue 45 and thus the rest or perch 14 as a whole will, when mounted in position on the handle, as shown in Fig. 1, be prevented from rotating around the axis of the handle, thus determining definitely and securely the position of the perch portion 19 thereof.

In the form of my invention shown in Fig. 2 instead of supplying a separate piece 14, as in Fig. 1, to provide the perch 19, the body portion of the handle proper forwardly of and above the shoulder 17 is provided with a downwardly rearwardly sloping elevated surface 30, the position and area and direction of which may be such as to provide a perch or fulcrum for the thumb which will function as that described in connection with Fig. 1.

The form of my invention shown in Fig. 3 is similar to that shown in Fig. 1 except that the sheet metal perch 40 thereof is disposed higher, that is, farther from the axis of the grip 3 for a purpose which will now be described.

To accommodate the handle as a whole to the preferences of various casters, the body 1 of the handle is not only provided with the pocket 10 described in connection with Fig. 1, but with a second pocket 10a similar thereto, but disposed in the shoulder 11 at a more elevated point. Thus as the caster may prefer, the base 8 of the reel may be lodged either in the pocket 10 or the pocket 10a, in either case being retained in position on the handle by the joint action of the pocket and the screw 12 above described.

I find in the practice of my invention that by selecting a height above the grip 3 for the perch 40 and a suitable angular disposition of the same, a single perch 40 made along the lines described in detail in connection with Figs. 1 and 4 may be provided to perform the function above described equally well with the reel in either of the two positions provided for by the pockets 10 and 10a.

In some cases it may be desirable to provide the perch or fulcrum of the form shown in Figs. 1, 3 and 4 of sheet metal rigid enough to perform the functions described for it and at the same time of material which will permit of its being bent to vary the diedral angle thereof to adjustably vary the height and degree of slope of the perch to accommodate it to the preferences of different casters.

While I have shown the perch 19 or 30 as planular, it will of course be understood that the same may be concave or convex and may be otherwise variously modified within the scope and spirit of my invention without sacrificing the advantages thereof.

My invention is not limited to the exact details of construction shown and described, inasmuch as many changes and modifications other than those referred to hereinabove may be made within the scope of my invention.

I claim:

1. In a casting rod handle adapted to support a line reel, a grip portion adapted to be grasped by the hand of the caster and an upwardly forwardly inclined plane surfaced perch portion on one side of the handle axis upon which surface the caster's thumb may rest in gripping the grip and upon which it may rock to bring the thumb into braking engagement with the reel.

2. In a handle for casting rods, adapted to be grasped by the hand of the caster, an upwardly forwardly inclined thumb support having a substantially planular surface upon which the thumb may exert a gripping force and upon which the thumb may rock to exert a braking force on a line reel secured to the handle.

3. In a casting rod handle, a longitudinally extending grip portion and an upwardly forwardly inclined elevated thumb rest formed from sheet metal and having a plane surface adjacent the forward end of the grip portion.

4. In a casting rod handle, a longitudinally extending grip portion and an upwardly forwardly inclined thumb rest having a substantially planular surface adjacent the forward end of and elevated above the grip portion.

5. In a casting rod handle, a body portion provided with a shoulder and a shank extending rearwardly from the shoulder, a grip portion telescoped on the shank and a thumb rest comprising a perforated plate of sheet metal telescoped on the shank and disposed between an end of the grip portion and said shoulder and the plate having a forwardly upwardly sloping extension.

6. In a handle for casting rods, a body portion extending generally in the direction of the rod axis, a plurality of reel frame engaging means on the handle body disposed serially transversely of the axis and adapted to secure a reel frame to the body in a corresponding plurality of positions with the rotational axis of the reel at different distances laterally with respect to the rod axis, a longitudinally extending grip portion on the handle, and an elevated thumb rest adjacent the forward portion of the grip and adjacent the reel upon which the caster's thumb may rock to exert a braking action on the reel in all of said positions thereof.

7. In a handle for casting rods, a body portion extending generally in the direction of the rod axis, a plurality of reel frame engaging means on the handle body disposed serially transversely of the axis and adapted to secure a reel frame to the body in a corresponding plurality of positions with the rotational axis of the reel at different distances laterally with respect to the rod axis, a longitudinally extending grip portion on the handle, and an elevated sheet metal adjustably bendable thumb rest adjacent a forward portion of the grip and having a forwardly upwardly sloping surface upon which the caster's thumb may rock to exert a braking action on the reel in all of said positions thereof.

8. In a casting rod handle, a body portion provided with a shoulder and a shank extending rearwardly from the shoulder, a grip portion telescoped on the shank and a thumb rest comprising a perforated plate of sheet metal telescoped on the shank and disposed between an end of the grip portion and said shoulder and the plate having a forward extension.

9. In a casting rod handle, a longitudinally extending grip portion and an upwardly forwardly inclined elevated thumb rest formed from sheet metal and adjustably bendable and disposed adjacent the forward end of the grip portion.

10. In a casting rod handle, a longitudinally extending grip portion and an upwardly forwardly inclined elevated thumb rest formed from sheet metal and having a plane thumb rest surface and adjustably bendable to change the elevation and direction of the plane surface and disposed adjacent the forward end of the grip portion.

11. In a casting rod handle, a handle portion, and a reel frame supporting portion forwardly of the handle portion provided with means to support a reel frame in any one of a plurality of laterally adjusted positions.

12. A casting rod handle as described in claim 11 and in which the reel supporting means comprises a reel frame engaging means in a forward portion of the reel supporting portion of the handle, and comprises a plurality of laterally spaced reel frame engaging means in a rearward portion of the reel supporting portion of the handle.

13. A casting rod handle as described in claim 11 and in which attaching means is provided in the forward portion of the reel supporting portion of the handle adapted to engage a forward portion of a reel frame and about which the rearward portion of the reel frame may pivot, and a plurality of laterally spaced reel frame engaging means is provided in a rearward portion of the reel frame supporting portion of the handle, any one of of which may engage a rearward portion of the reel frame to dispose a reel on the frame in any one of a plurality of laterally adjusted positions.

In testimony whereof I hereunto affix my signature this 30th day of October, 1929.

WILLIAM A. FOSS.